May 22, 1962  CARL-LUDWIG NOTTEBOHM ET AL  3,035,943
PRODUCING GAS-FILTER MAT
Filed Aug. 26, 1959

Inventors

United States Patent Office 3,035,943
Patented May 22, 1962

3,035,943
PRODUCING GAS-FILTER MAT
Carl-Ludwig Nottebohm, Robert Schabert, and Albrecht Burk, Weinheim an der Bergstrasse, Germany, assignors to Firma Carl Freudenberg, Kommanditgesellschaft auf Aktien, Weinheim an der Bergstrasse, Germany
Filed Aug. 26, 1959, Ser. No. 836,301
Claims priority, application Germany Sept. 25, 1956
2 Claims. (Cl. 117—140)

This invention relates to a regenerable fiber mat suitable for the filtration of gases.

This application is a continuation-in-part of our application Serial No. 685,859, filed September 24, 1957, and now abandoned.

Non-regenerable fiber mats suitable for the filtration of gases are described and claimed in several patents. These filter mats, however, have certain disadvantages. First of all, they offer too much resistance to the passage of air. So, there exist no uniformly bonded filter mats having an air permeability which is less than 5 mm. water column at a speed of the streaming air of 1.5 meters per second. This value which should be substantially maintained even after prolonged use is the lower limit which is required for most technical purposes, e.g. for the application in the air tunnels in automobiles.

Another disadvantage of these known filter mats is their relatively high specific weight and their low resistance against compressing forces. In most fibrous filter mats, the individual fibers are not or only to a very small extent bonded together in the interior of the filter mat. So, they need facing sheets on the opposite surfaces or relatively large amounts of an adhesive must be sprayed on one or both surfaces of such non-woven filter mats in order to effect a strong bonding of those fibers to one upon another which are present in the surface areas. Although said filter mats contain loose aggregated fibers in the interior of the non-woven structures can be made self-sustaining by the application of facing sheets or relatively large amounts of an adhesive to one or both surfaces; it is self-explanatory that just for that very reason the air permeability decreases, since a large area of the surface will be blocked by impervious materials.

It is further obvious that the air permeability sharply decreases after dust particles have deposited on those spots which were still free for the passage of air. Thus, the filter will be clogged long before an appreciable amount of dust particles has penetrated into the interior of the filter mat. For this reason, it is practically senseless to make thick non-woven fiber mats in an attempt to improve the filtering effect or the dust absorption capacity.

It is interesting to note that all the known methods for the production of filter mats from non-woven fabrics of open filamentary structure which is necessary for the free passage of air, carefully avoid impregnation of the starting materials, i.e. the unwoven unfelted skeleton framework, under pressure. On the contrary, prior art methods in most cases spray an adhesive on the surface of said skeleton framework of fibers. As previously stated, the droplets of the adhesive deposit preferably on the fibers of the outer parts of the fiber fleece. Only a very small percentage of the adhesive, if at all, will penetrate to the inner parts. Thus the resulting porous structure is therefore of different stability in its various parts. But once the surface cover is damaged, the whole filter mat has to be discarded since the fibers of the inner part of the filter structure are released. Needless to say that such filters cannot be regenerated by washing with water.

The last mentioned disadvantage may of course be overcome by impregnating the porous skeleton framework of fibers in random direction with a liquid adhesive under pressure, for example by passing the impregnated fiber web through a pair of rollers, as described in the Patent No. 2,774,687 to Nottebohm et al. Under these conditions, however, the open porous skeleton framework structure of the dry starting web is entirely destroyed. Only sheet material similar to textile or leather of a maximum thickness of 2.5 mm. may be obtained. Said products are distinguished by valuable properties, such as softness, porosity, elasticity, springiness, crease-resistance, water resistance, and fastness against washing and cleaning. Although they may filter the air from dust particles, they cannot be employed as gas filters under the conditions of practice, since their permeability is too low. Thus, in order to pass air through that leatherlike sheet at a velocity of 1.5 meters per second, a minimum pressure difference of 100 mm. water column is necessary. Also the dust storing capacity is poor.

Any of the prior art references in this field recommend the application of aqueous rubber latex or aqueous adhesives to which a wetting agent such as sodiumbenzenesulphonate has been added. Although said methods allow a complete thorough impregnation and in consequence thereof, a uniform bonding throughout the entire fleece, the open porous skeleton structure of the dry fiber fleece cannot be maintained during the impregnation step. After a complete impregnation in the presence of wetting agents and under pressure, the thickness of the impregnated fiber fleece is only about 1 to 5 percent or even less of the original dry fiber fleece. Those skilled in the art call this phenomena collapsing of the fleece.

The only way to prevent collapsing of the skeleton structure of the dry fiber fleece consisted in spraying the adhesive on the dry fleece without subjecting it to pressure. The disadvantages of said method have been previously stated.

It is now one object of this invention to make highly porous, self-supporting stable, substantially non-compressible filter mats which may be regenerated by washing with water.

Still another object of the invention is to provide a process whereby the skeleton structure of a dry fiber fleece is substantially maintained during the step of a thorough impregnation with a liquid adhesive under pressure. A still further object of the invention is the production of regenerable fiber mats suitable for the filtration of gases in which any fiber is bonded to the neighboring fiber with the same strength, thereby substantially maintaining the skeleton structure of the dry fiber fleece and the high air permeability even after prolonged use.

A still further object of the invention is the production of fiber mats suitable for the filtration of gases, the thickness of which after impregnation under pressure is at least 30 percent of the thickness of the starting dry fiber fleece, and the specific weight of which is about 0.007 to 0.05.

The above and related objects will appear more clearly from the following description of typical ways and means of obtaining the objectives referred to, which description has reference to the appended drawings wherein.

Figure 1:
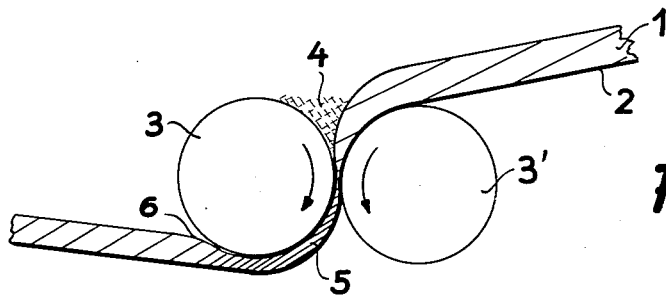
FIGS. 1 and 2 are explanative and show preferred embodiments of the impregnation step.

In accordance with the present invention, we have found that if a special combination of solvents and adhesives is used for the impregnating of a dry fiber fleece, the skeleton structure of said fleece may be substantially maintained even during a through impregnation under pressure.

The left column of the following table shows suitable adhesives that may be dissolved in any of the solvents or mixtures thereof listed in the right column:

| Adhesive | Solvent |
|---|---|
| Polyamide | Butylalcohol. |
| Hexamethylolmelamine | Methylalcohol. |
| Triphenylmethanetriisocyanate 4,4',4'' | { Benzene. <br> { Methylenechloride. |
| Diisocyanates, e.g. <br> $O=C=N-C_6H_5-CH_2-C_6H_5-N=C=O$ | { Trichloroethylene. <br> { Acetone. |
| Urea-formaldehyde condensation products, e.g. "Plastopal." | Acetic acid ester. |

The solution made by dissolving one or more of the above mentioned adhesives in any of said solvents or mixtures thereof should contain between 8 and 70 percent, preferably 35 to 55 percent of said adhesives. It is also possible to replace part of the costly solvents or solvent mixtures by water. However, care must be taken to avoid the addition of too much water since solutions containing little more than a definite amount of water cause the collapse of the skeleton structure of the dry fiber fleece. Although there is a very sharp limit for each solvent or solvent mixture, it is not possible to state in general terms that amount of water which is maximal permissible in said solvents or mixtures thereof, since said value is different in each specific case.

It can be said, however, that none of the above mentioned solvents or solvent mixtures may contain more than 50 percent of water. Furthermore, only such water-containing solvent combination can be used that form a homogeneous liquid and in which no wetting agents are present.

The starting material for the production of the novel filter mats consists of a batt of cardable fibers. The fibers include fibers of vegetable origin, such as cotton, ramie, flaked bast, fibers of animal origin, such as sheep wool, synthetic fibers, such as viscose rayon, copper rayon, acetate rayon, polyamides, polyvinylchlorides, polyvinylidene chlorides, polyacrylonitriles, polyvinyl alcohols, polyethylenes, polyesters, among these also synthetic protein fibers, e.g. Merinova, Ardil, Vikare, or fibers produced from copolymerisates; included furthermore are mixtures of these fibers among themselves and with other fibers. Cardable fibers, i.e. those having a length of at least 4 mm. are first formed into a loose fleece in which the fibers are randomly arranged in intersecting directions, i.e. polyposed. This loose fleece should have a thickness of at least greater than 12 mm., and preferably at least 25 mm., and may be produced in any conventional or known manner. This fleece may be produced, for example, by forming thin, carded layers or webs of the fabric on a conventional carding machine, and laying the webs one across the other, so that the direction of the fibers criss-cross each other, in intersecting directions. The fleece may also be produced in any other known manner, as for example, by means of the random web process.

Figure 2:
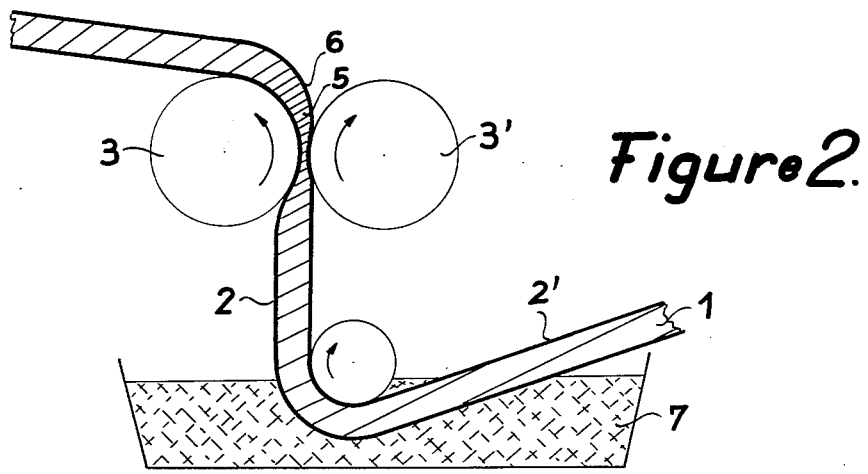

Prior to the impregation and compression as shown in FIGURES 1 and 2 it has been found preferable to prestabilize one or both surfaces of the fleece. This may be done, for example, by applying a small quantity of the bonding agents to the surface or surfaces to be stabilized, as for example, by spraying or brushing, and by setting this bonding agent in the conventional manner to provide for the prestabilization. The application of the bonding agent for the prestabilization should be effected in such a manner that the inter-spaces between the fibers of the surface layers are preserved and are not filled by the bonding agent. The amount of the bonding agent necessary for the pre-stabilization is about 10 percent of the total amount. After application of the pre-stabilization layer (e.g. by foaming, spraying) follows a drying step which may be performed according to conventional methods, e.g. by passing the thus treated fleece through a drying device. Other methods for the pre-stabilization are described in Example 3.

Referring to FIG. 1 of the drawing, the thick fleece 1, produced in the manner described above, which is pre-stabilized on its surface 2 in the manner described above, is passed through the nip of the roller pair 3, 3'. The space above the nip between the rollers is filled with the impregnating agent 4 which uniformly impregnates the fleece 1 before and during its passage through the roller nip. The impregnated fleece 5 leaves the roller nip in a strongly compressed state, but expands and bulges out at 6 to a volume which is at least one-third of the thickness of the starting fleece. The expanded fleece structure is then conducted through a drying chamber (not shown), in which the volume and structure are fixed and stabilized by a setting of the bonding agent in the impregnation liquid.

In the embodiment shown in FIG. 2, the fleece 1, prepared as described above has both surfaces 2, 2' pre-stabilized in the manner described above, by treatment with small quantities of the bonding agents while preserving the interstices between the fibers. The fleece is then conducted through an impregnating bath 7, in which it is uniformly wetted by the impregnating agent. From the impregnating bath, the fleece is guided vertically upward through the nip of the rollers 3, 3'. Upon passing through the roller nip, the impregnated fleece is freed from excess impregnating agents by the squeezing action and compressed. The strongly compressed fleece which emerges at 6, expands and bulges out again on its way to the drying chamber where it is fixed and stabilized by drying.

Figure 3:
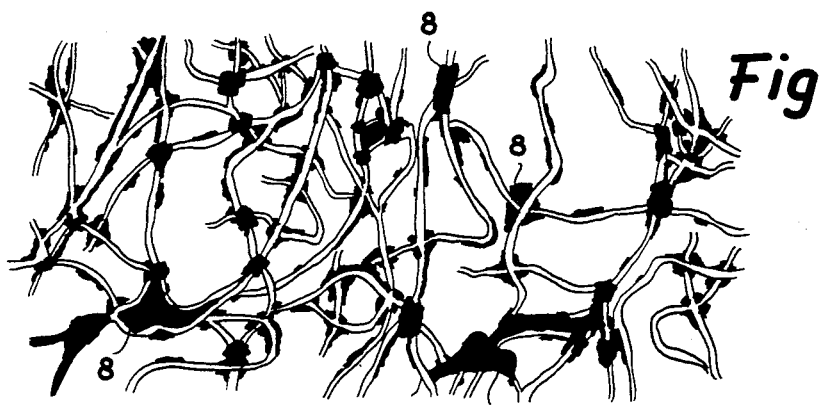
FIG. 3 is an enlarged detail view illustrating the three dimension random arrangement of the fibers after having passed the squeezing rollers 3, 3' and a heating zone (not shown).

FIGURE 3 is an enlarged detail view of the filter mat made according to the above described method. The adhesive 8 deposes in the form of droplets in haphazard manner, preferable, however, at the intersections of two fibers, thus cementing them together. It should be emphasized that said detail view may be obtained by enlarging any section of the filter mat, since there is a uniform bonding throughout the entire mat. The amount of adhesive incorporated into the filter mat neither improves nor deteriorates the filtering capacity of the final filter mat. The adhesive is only necessary to stabilize the open skeleton structure of the originally dry fiber fleece in which the individual fibers are loosely aggregated. It is not the purpose of the invention to incorporate a certain amount of an adhesive into a fiber fleece but to incorporate an adhesive under such conditions that the open porous skeleton structure of the dry fiber fleece and its outstanding filtering characteristics are substantially maintained during the impregnation with an adhesive. Although it is impossible to fully maintain the thickness of the dry fiber fleece during the above described impregnation under pressure, our method provides a considerable improvement in this respect since the thickness after impregnation still amounts to at least 30 percent of the original thickness of the starting fiber fleece, whereas the thickness of any fiber fleece impregnated by any other method is about 1 to 5 percent of the dry fiber fleece, thus furnishing structures the porosity of which is too low for filter purposes.

*Example 1*

A fiber fleece or web, prepared by means of carding, consisting of 300 grams per square meter polyamide fibers of 60 mm. staple length and 15 denier having a web thickness of 50 mm. and a specific gravity of 0.006, was coated uniformly on one side with the use of a doctor blade with a foam mixture consisting of a copolymer of polyvinyl chloride acetate of the following composition:

| Composition | Solid, parts by weight | Liquid, parts by weight |
|---|---|---|
| Aqueous emulsion containing 50 percent of a copolymerisate of equal parts of polyvinylchloride and polyvinyl acetate | 50 | 100 |
| Water | | 795 |
| Sodiumbenzenesulphonate, aqueous solution | 3.7 | 5 |
| | 53.7 | 900 | and then dried. The increase in weight of the fiber web as a result of this process was 3 percent, i.e. the total weight of the prestabilized web amounts to 309 grams. The thickness of the web was reduced to 36 mm.

This fiber web which had been prestabilized on one side was then thoroughly impregnated with a solution of a bonding agent consisting of:

| | Parts by weight |
|---|---|
| Polyamide (solid) | 28 |
| Solvents: methyl alcohol | 70 |
| Benzene | 20 |
| Water | 10 | and passed into a squeezing device consisting of two rolls spaced 0.5 mm. apart. The excess solution was squeezed off until a wet pick up of 100 percent. After leaving the roll nip, the impregnated fiber web expanded to 30 percent of the original volume and was subjected for 12 minutes to a drying process at 115° C. The content of binder, calculated on the weight of the dry original web mat was 28 percent, the final filter mat had a specific gravity of 0.0, a thickness of 12 mm. (which therefore had dropped to 33 percent of the value it had before the thorough impregnation). The compressibility under a load of 10 kg. per square meter is not measurable. The air resistance at an air velocity of 1.5 meters per second is 2.8 mm. water column.

*Example 2*

The web or fleece is produced from polyamide fibers in the same way as in Example 1, the impregnation and drying being also the same.

The fiber web, prestabilized on one side as in Example 1, is thoroughly impregnated with a binder having the following composition:

| | Parts by weight |
|---|---|
| Hexamethylolmelamine | 55 |
| Diammoniumphosphate | 5 |
| Water | 23 |
| Methyl alcohol | 17 |

Squeezing out is effected by a pair of rolls having a nip of 0.4 mm. until a wet pick up of 120 percent. The fiber web from which the excess binder has been removed is dried and condensed for 12 minutes at a temperature of 130° C.

The final product has the following properties:

| | |
|---|---|
| Thickness | 17 mm. (47 percent of the prestabilized web). |
| Specific gravity | 0.028. |
| Compressibility under a load of 10 kg. per square meter | Not measurable. |
| Air resistance at an air velocity of 1.5 meters per second | 4.1 mm. water column. |

*Example 3*

A fiber web or fleece, consisting of 92 parts of polyester fibers, 60 mm. staple length, 22 denier and 8 parts of polyvinyl chloride fibers, 40 mm. staple length, 3 denier, weight of fiber web 250 grams per square meter, is subjected for 6 minutes to a temperature of 115° C. and in this manner prestabilized sufficiently throughout by shrinkage of the polyvinyl chloride fibers so that impregnation by a squeezing device is made possible. The fiber web prestabilized in this manner is impregnated with a binder solution of the following composition.

| | Parts |
|---|---|
| Triphenylmethanetriisocyanate 4,4′,4″ in a solution of methylenechloride, concentration 20 percent | 316 |
| Polyester of 3 mol adipic acid, 3 mol butyleneglycol and 1 mol glycol, sold as "Desmophene 800", in a solution of trichloroethylene, concentration 50 percent | 200 |

The fiber web is freed from the excess by a pair of rolls (roll nip 0.4 mm.). The wet pick up is 100 percent. The impregnated fiber web expands to a web thickness of 28 mm. and is now subjected to drying at 115° C. for 12 minutes. The product has the following properties:

| | |
|---|---|
| Thickness | 17 mm. |
| Specific gravity | 0.019. |
| Compressibility under a load of 10 kg. per square meter | 4 percent. |
| Air resistance at an air velocity of 1.5 meters per second | 2.1 mm. water column. |

*Example 4*

A fiber fleece, consisting of 380 grams per square meter sheep's wool, type B, web thickness 80 mm., is prestabilized on one side as in Example 1. The web prestabilized in this manner is impregnated with a solution as in Example 1, and fed to a squeezing device consisting of two rubber rolls. The wet pick up is 80 percent. The impregnated fiber web expands after leaving the squeezing device to a thickness of 33 mm. and is dried at 115° C. for 12 minutes. The product has the following properties:

| | |
|---|---|
| Thickness | 33 mm. |
| Specific gravity | 0.014. |
| Compressibility under a load of 10 kg. per square meter | 10 percent. |
| Air resistance at an air velocity of 1.5 meters per second | 4.8 mm. water column. |

*Example 5*

A fiber web fleece, consisting of 250 grams per square meter spun rayon viscose, 60 mm. staple length, 22 denier and 60 mm. thickness, is uniformly mixed during the carding with 50 grams of polyethylene powder and thereupon subjected to a temperature of 125° C. The polyethylene powder introduced, due to its plasticity at the existing temperature, effects a slight bonding together of the fibers. The fiber web which is in this way slightly stabilized through and through has a thickness of 55 mm. and is now subjected to the impregnation process, with the solution used in Example 1. The excess binder is squeezed out by a pair of rolls. The nip is 0.4 mm., the wet pick up 80 percent. The impregnated web is thereupon dried for 12 minutes at 115° C. The product has the following properties:

| | |
|---|---|
| Thickness | 50 mm. |
| Specific gravity | 0.007. |
| Compressibility under a load of 10 kg. per square meter | 6 percent. |
| Air resistance at an air velocity of 1.5 meters per second | 2.1 mm. water column. |

*Example 6*

A fiber web or fleece, consisting of 150 grams per square meter polyamide fibers, 15 denier, 60 mm. staple length is stabilized on one side as in Example 1, by the application of a covering foam. Upon introduction into the impregnating solution a similar web is fed to it in such a manner that the two prestabilized sides lie on the outside. The weight of this combined web is then 309 grams, the thickness 36 mm. The impregnating and squeezing are effected as in Example 1. The product has the following properties:

| | |
|---|---|
| Thickness | 12 mm. |
| Specific gravity | 0.033. |
| Compressibility under a load of 10 kg. per square meter | 3 percent. |
| Air resistance at an air velocity of 1.5 meters per second | 3.0 mm. water column. |

The product differs from that of Example 1 solely by the fact that it has a surface prestabilized on both sides.

We claim:

1. In a method of producing a self-sustaining highly porous regenerable gas-filter mat, the steps of applying relatively small amounts of a bonding agent in the form of a foam to one surface of a batt of loosely cardable fibers arranged in random directions having a bulk weight of about 0.006, subsequently drying the thus resulting prestabilized structure and then through-impregnating it with a 8–60% solution of:

(a) a binder material selected from the group consisting of polyamides, hexamethylolmelamine, triphenylmethanetriisocyanates, diisocyanates, ureaformaldehyde condensation products dissolved in (b) a mixture consisting of 0–50% water, the remainder being a solvent selected from the group consisting of methyl alcohol, benzene, methylenechloride, trichloroethylene, acetone butylalcohol, acetic acid ester, squeezing off excess solution from said impregnated batt with a roller pair, the nip of which is adjusted to amount to about $1/80$ to $1/100$ of the thickness of the dry fiber batt, and finally drying the thus resulting uniformly impregnated batt above 100° C. for about 10 minutes.

2. In a method of producing a self-sustaining highly porous regenerable gas-filter mat, the steps of subjecting a batt consisting of a relatively small amount of loosely cardable shrinkable fibers and a relatively large amount of non-shrinkable cardable fibers arranged in random directions to shrinkage temperatures and then through-impregnating the thus resulting prestabilized structure with a 8–60% solution of:

(a) a binder material selected from the group consisting of polyamides, hexamethylolmelamine, triphenylmethanetriisocyanate, diisocyanates, ureaformaldehyde condensation products dissolved in (b) a mixture consisting of 0–50% water, the remainder being a solvent selected from the group consisting of methyl alcohol, benzene, methylenechloride, trichloroethylene, acetone butylalcohol, acetic acid ester, squeezing off excess solution from said impregnated batt with a roller pair, the nip of which is adjusted to amount to about $1/80$ to $1/100$ of the thickness of the dry fiber batt, and finally drying the thus resulting uniformly impregnated batt above 100° C. for about 10 minutes.

References Cited in the file of this patent

UNITED STATES PATENTS

| | | |
|---|---|---|
| 1,945,714 | Winogradow | Feb. 6, 1934 |
| 2,106,096 | Hoffman | Jan. 18, 1938 |
| 2,497,117 | Dreyfus | Feb. 14, 1950 |
| 2,514,145 | Stevens | July 4, 1950 |
| 2,607,494 | Valente et al. | Aug. 19, 1952 |
| 2,719,802 | Nottebohm | Oct. 4, 1955 |
| 2,879,197 | Muskat et al. | Mar. 24, 1959 |
| 2,888,095 | Perrini et al. | May 26, 1959 |

UNITED STATES PATENT OFFICE
CERTIFICATE OF CORRECTION

Patent No. 3,035,943    May 22, 1962

Carl-Ludwig Nottebohm et al.

It is hereby certified that error appears in the above numbered patent requiring correction and that the said Letters Patent should read as corrected below.

Column 1, line 37, for "contain" read -- containing --; line 63, for "Thus the" read -- The thus --; same column 3, line 56, for "impregation" read -- impregnation --; column 6, line 31, after "web" insert -- or --.

Signed and sealed this 11th day of September 1962.

(SEAL)
Attest:

ERNEST W. SWIDER
Attesting Officer

DAVID L. LADD
Commissioner of Patents